March 10, 1936. H. E. ANDERSON 2,033,171
BRAKE SHOE KEY
Filed April 23, 1934
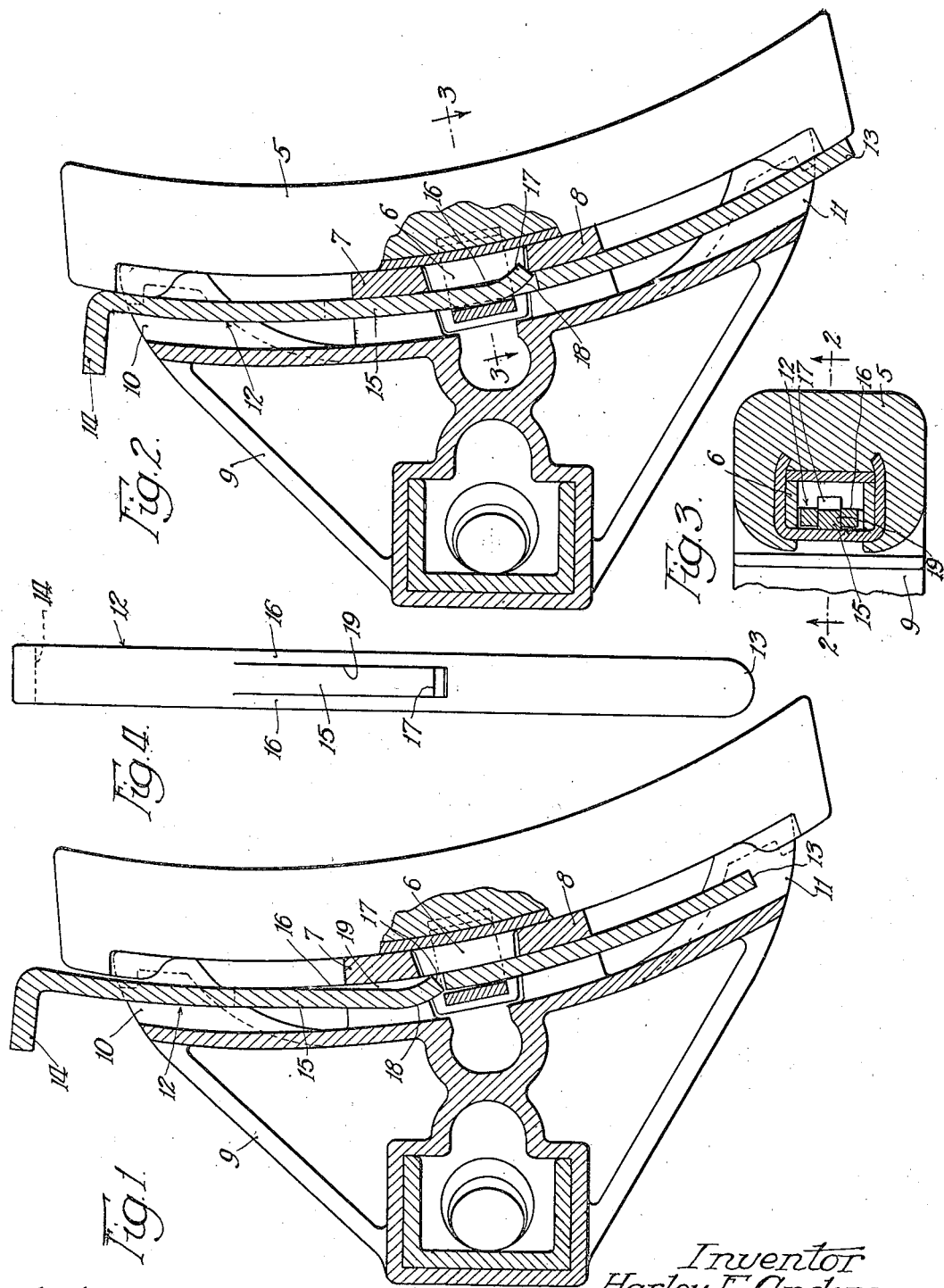
Witness:
V. Siljander
Inventor
Harley E. Anderson
Hill & Hill. Attys.

Patented Mar. 10, 1936

2,033,171

UNITED STATES PATENT OFFICE 2,033,171

BRAKE SHOE KEY

Harley E. Anderson, Chicago, Ill., assignor to William E. Sharp, Chicago, Ill.; Minnie E. Sharp executrix of said William E. Sharp, deceased Application April 23, 1934, Serial No. 721,922

5 Claims. (Cl. 188—243)

This invention relates to certain new and useful improvements in car brake construction, and particularly to improvements in brake shoe keys for securing brake shoes to the heads of a car brake system.

Heretofore, it has been difficult, with the present type of brake shoe key, to keep the brake shoe tightly keyed or secured to the brake head due to the fact that the ordinary key is solid and tapered on all four sides, and consequently of relatively narrow and of varying cross-section.

When this type of key is first driven into place through the center lugs of the brake head and the supporting lug of the shoe, the only point of engagement which the key has with the shoe lug is a line-contact at the top of the shoe lug because of the tapered construction of the key.

Under such conditions, relative movement and wear of the associated brake shoe heads and keys starts immediately, and soon the shoe becomes loose, resulting in the necessity of again driving the key into place if it is to hold the brake shoe tightly against the brake head.

This work, of course, cannot be done while a car is in service, and as a result, the heavy shoe continues to vibrate against the brake head and soon wears the head until the brake beam must be removed and a new one installed.

One object, therefore, of the present invention is to provide improved means for maintaining a brake shoe tightly and continuously in contact with the brake head to prevent relative movement of the shoe and head, and thus eliminate wear at their points of contact.

Another object of the invention is to provide a brake shoe key having means associated therewith for continuously urging the brake shoe toward, and into tight contact with the brake head.

Another object of the invention is to provide a brake shoe key having resilient means associated therewith adapted to engage a brake shoe supporting lug under high tension for securely and continuously holding the brake shoe tightly against the brake head, and to provide means for guiding said resilient means into the aperture formed in the brake shoe supporting lug.

A further object of the invention is to provide a brake shoe key having a resilient tongue formed integrally therewith and extending laterally from the plane thereof, and having means associated with said tongue to provide a stop for the key as it is being positioned in operative relationship with respect to the supporting lugs of the brake shoe and head.

A still further object of the invention is to improve devices of the character described in sundry details hereinafter referred to particularly pointed out in the appended claims.

One embodiment of the present invention is shown for illustrative purposes in the accompanying drawing, in which:

Fig. 1 is a sectional elevational view of a brake shoe and brake head illustrating the application of my improved brake shoe key thereto, the key being shown just previous to its being driven into operative position with relation to the supporting lugs of the brake shoe and head;

Fig. 2 is a sectional elevational view similar to Fig. 1 showing my improved brake shoe key in operative position, the view being taken substantially as indicated by the lines 2—2 of Fig. 3;

Fig. 3 is a fragmentary transverse plan view taken substantially as indicated by the line 3—3 of Fig. 2; and Fig. 4 is a face view of my improved brake shoe key illustrated in Figs. 1 and 2 of the drawing.

In the drawing illustrating an embodiment of the present invention, a brake shoe 5 of standard construction is provided with an apertured supporting lug 6 adapted to be positioned between upper and lower apertured center lugs 7 and 8, respectively, formed on a brake head 9, also of standard construction, the brake head being provided also with top and bottom toe portions 10 and 11, respectively, adapted to bear against the back of the brake shoe 5 adjacent its upper and lower end portions.

For securing the brake shoe and brake head together in operative relation with respect to each other, my improved brake shoe key indicated as a whole by the numeral 12 is provided, the key being formed, preferably, from a standard piece of spring bar steel of substantially uniform cross-section, curved to conform substantially to the contour of the brake shoe 5, and provided at its lower end with a rounded portion 13 adapted to facilitate the insertion of the key into the apertures of the lugs 6, 7 and 8, and provided adjacent its upper end with a laterally extending draw head 14 for facilitating the removal of the key from the lugs.

For continuously urging the brake shoe 5 toward the brake head 9 and tightly into engagement therewith to prevent relative movement of the shoe and head, a tongue portion 15 is struck up from the body 16 of the key 12 adjacent its central portion, and the portion 15 is pressed outwardly to provide a resilient tongue extending laterally from the plane of the body portion, in a manner to increase the overall thickness of the key adjacent the free end of the tongue portion 15, the tongue portion 15 adjacent its free end having a laterally bent portion 17 extending back into the plane of the body portion, as clearly shown in Fig. 1.

After the key is thus formed it may be oil-tempered to provide the tongue portion 15 with a high degree of tension when moved out of its normal position shown in Fig. 1.

In assembling the brake shoe 5 and head 9 by the use of my improved key 12, the brake shoe and head will be assembled in operative relation and the key 12 dropped into position in the apertures of the lugs 6, 7 and 8 as shown in Fig. 1, and it will be noted that the laterally bent portion 17 at the free end of the tongue portion 15 provides a cam surface indicated at 18, which serves to guide the free end of the tongue 15 into the aperture of the shoe supporting lug 6 when the key is forced downwardly into operative brake shoe holding position.

It will be noted also that when the key 12 is moved into its operative position, shown in Fig. 2, the tongue 15 will be forced toward the plane of the key body, against the tension exerted by the tongue, to a position nearly flush with the body portion 16 of the key, and that the laterally bent portion 17 of the tongue will be forced through the slot 19, formed by the striking up of the tongue 15, in a manner to cause the end portion 17 of the tongue to engage the top portion of the lower brake head lug 8 as the key is moved downwardly, thereby providing a stop for the key to position the resilient tongue 15 in proper relation with respect to the brake shoe supporting lug 6, and to provide a full bearing of the effective portion of the resilient tongue in the brake shoe lug 6 in a manner to draw the brake shoe snugly against the brake head lugs 7 and 8 and the top and bottom toes 10 and 11, with sufficient pressure to effectively and continuously maintain the brake shoe and head against relative movement with respect to each other.

When it is desired to remove or change a brake shoe the key 12 may be withdrawn from the position shown in Fig. 2 until the tongue clears the brake shoe lug 6, whereupon the tongue will spring back to its normal position as shown in Fig. 1, after which the key may be easily removed and replaced to hold a new brake shoe snugly against the brake head 9 in the manner above described.

It will be observed from the foregoing description that the present invention provides a construction and arrangement whereby the brake shoe is held tightly and continuously in contact with the brake head to prevent relative movement of the shoe and head, thereby eliminating wear at their points of contact and preventing looseness in the brake shoe assembly.

Obviously, the present invention is not limited to the precise construction and arrangement shown and described, as the same may be variously modified. Moreover, all the features of the invention need not be used conjointly, as the same may be used to advantage in variously different combinations and sub-combinations.

What I claim as new and desire to secure by Letters Patent is:

1. In a device of the class described, the combination with a brake shoe having a supporting lug, and a brake head having upper and lower center lugs positioned, respectively, on the upper and lower sides of said supporting lug, said lugs having apertures formed therein, of a brake shoe key positioned in said apertures, said key having a resilient portion formed integrally therewith and engageable with said brake shoe supporting lug for continuously urging said brake shoe toward said brake head and engageable with one of said brake head lugs for positioning said resilient portion in operative position with respect to said shoe supporting lug.

2. In a device of the class described, the combination with a brake shoe having a supporting lug, and a brake head having upper and lower center lugs positioned, respectively, on the upper and lower sides of said supporting lug, said lugs having apertures formed therein, of a brake shoe key positioned in said apertures, said key having a resilient member engageable with said brake shoe supporting lug for continuously urging said brake shoe toward said brake head, said member having a portion adjacent one of its ends for guiding the resilient member into the aperture formed in said brake shoe supporting lug and engageable with one of said brake head center lugs to provide a stop for said key.

3. In a device of the class described, the combination with a brake shoe having a supporting lug, and a brake head having upper and lower center lugs positioned, respectively, on the upper and lower sides of said supporting lug, said lugs having apertures formed therein, of a brake shoe key positioned in said apertures, said key having a resilient tongue engageable with said brake shoe supporting lug for continuously urging said brake shoe toward said brake head, said tongue having a portion adjacent its free end for guiding the resilient tongue into the aperture formed in said brake shoe supporting lug and engageable with said lower center lug of the brake head to provide a stop for said key.

4. In a device of the class described, the combination with a brake shoe having a supporting lug, and a brake head having upper and lower center lugs positioned, respectively, on the upper and lower sides of said supporting lug, said lugs having apertures formed therein, of a brake shoe key positioned in said apertures, said key being formed of material of substantially uniform cross-section and having a resilient tongue formed integrally therewith and engageable with said brake shoe supporting lug for continuously urging said brake shoe toward said brake head, said tongue having a laterally extending portion adjacent its free end for guiding the resilient tongue into the aperture formed in said brake shoe supporting lug and engageable with said lower center lug of said brake head to provide a stop for said key.

5. A brake shoe key comprising a curved body portion, and a struck-up resilient tongue formed integrally with said body portion, said tongue extending laterally from the plane of said body portion at the outer curved side thereof and adapted to engage a brake shoe supporting lug when in operative position, said tongue having a laterally bent portion adjacent its free end extending into the plane of said body portion.

HARLEY E. ANDERSON.